United States Patent [19]
Bott

[11] 4,274,568
[45] Jun. 23, 1981

[54] COMBINATION OF LUGGAGE CARRIER AND PERSONAL LUGGAGE

[76] Inventor: John A. Bott, 931 Lakeshore Dr., Grosse Pointe Shores, Mich. 48236

[21] Appl. No.: 39,196

[22] Filed: May 15, 1979

[51] Int. Cl.³ .......................... B60R 9/04; B60R 11/00
[52] U.S. Cl. .................................. 224/319; 224/324; 220/69; 410/105
[58] Field of Search ............... 224/319, 315, 324–325; 220/18, 69; 190/60, 61; 403/353, 254; 248/503, 506; 16/172; 49/57

[56] References Cited

U.S. PATENT DOCUMENTS

| | | | |
|---|---|---|---|
| 1,110,678 | 9/1914 | Franklin | 49/57 |
| 3,212,457 | 10/1965 | Looker | 410/105 |
| 3,224,048 | 12/1965 | Sullivan | 49/57 |
| 3,253,755 | 5/1966 | Bott . | |
| 3,330,454 | 7/1967 | Bott . | |
| 3,366,295 | 1/1968 | Nygaard | 224/319 |
| 4,015,760 | 4/1977 | Bott . | |
| 4,055,284 | 10/1977 | Bott . | |
| 4,059,923 | 11/1977 | Sauer | 49/57 |
| 4,099,658 | 7/1978 | Bott . | |
| 4,132,335 | 1/1979 | Ingram | 224/324 |

*Primary Examiner*—Herbert F. Ross
*Attorney, Agent, or Firm*—Harness, Dickey & Pierce

[57] ABSTRACT

A luggage carrier mounted on the exterior surface of an automobile body surface is particularly adapted for the removable attachment thereto of conventional pieces of personal luggage which in turn have been modified so that they may be readily and dependently secured on the carrier but may be easily removed for their customary use as personal pieces of luggage. Further, the construction and arrangement of the luggage are such that personal luggage of different sizes may be accommodated with equal security for all luggage.

10 Claims, 8 Drawing Figures

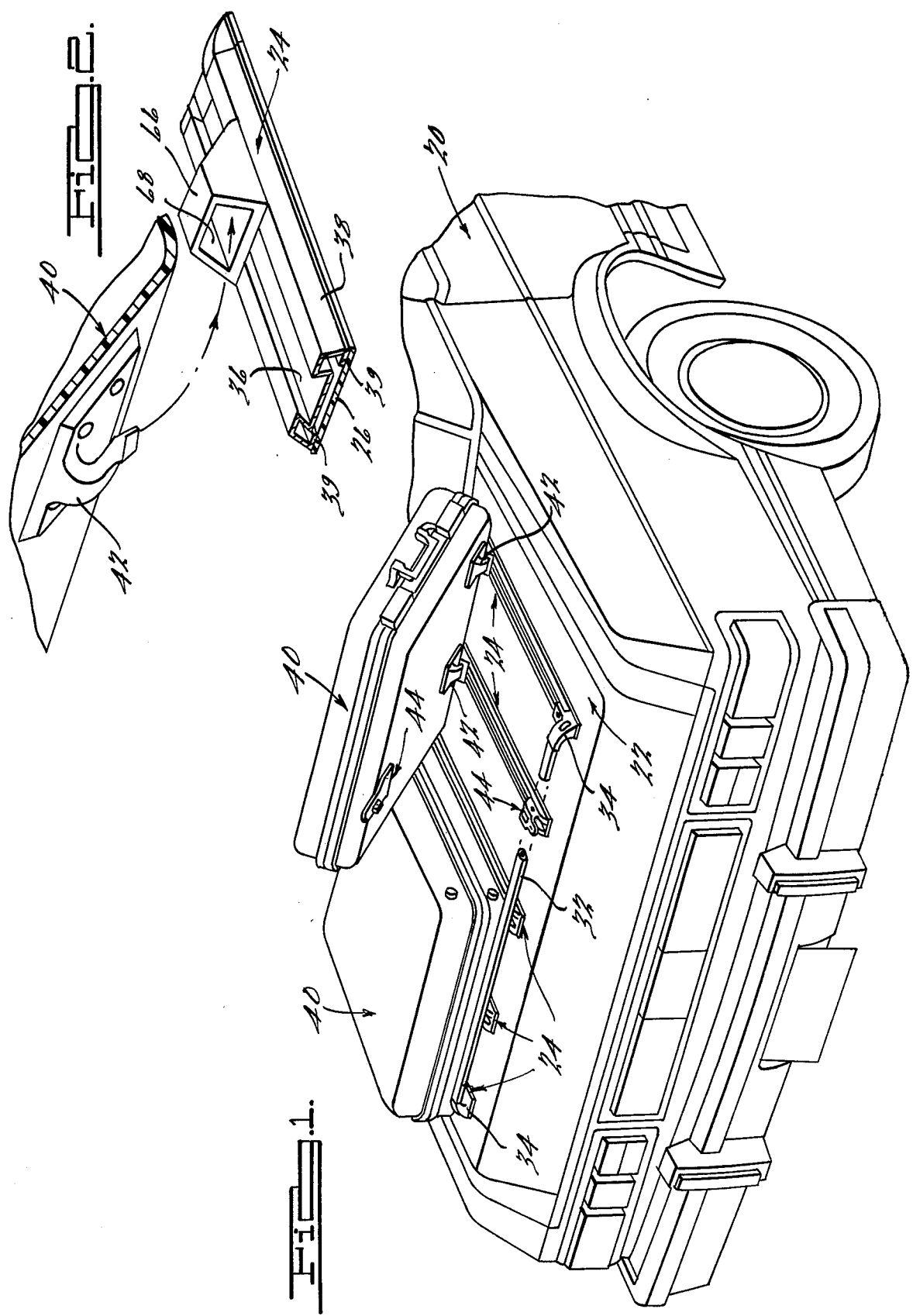

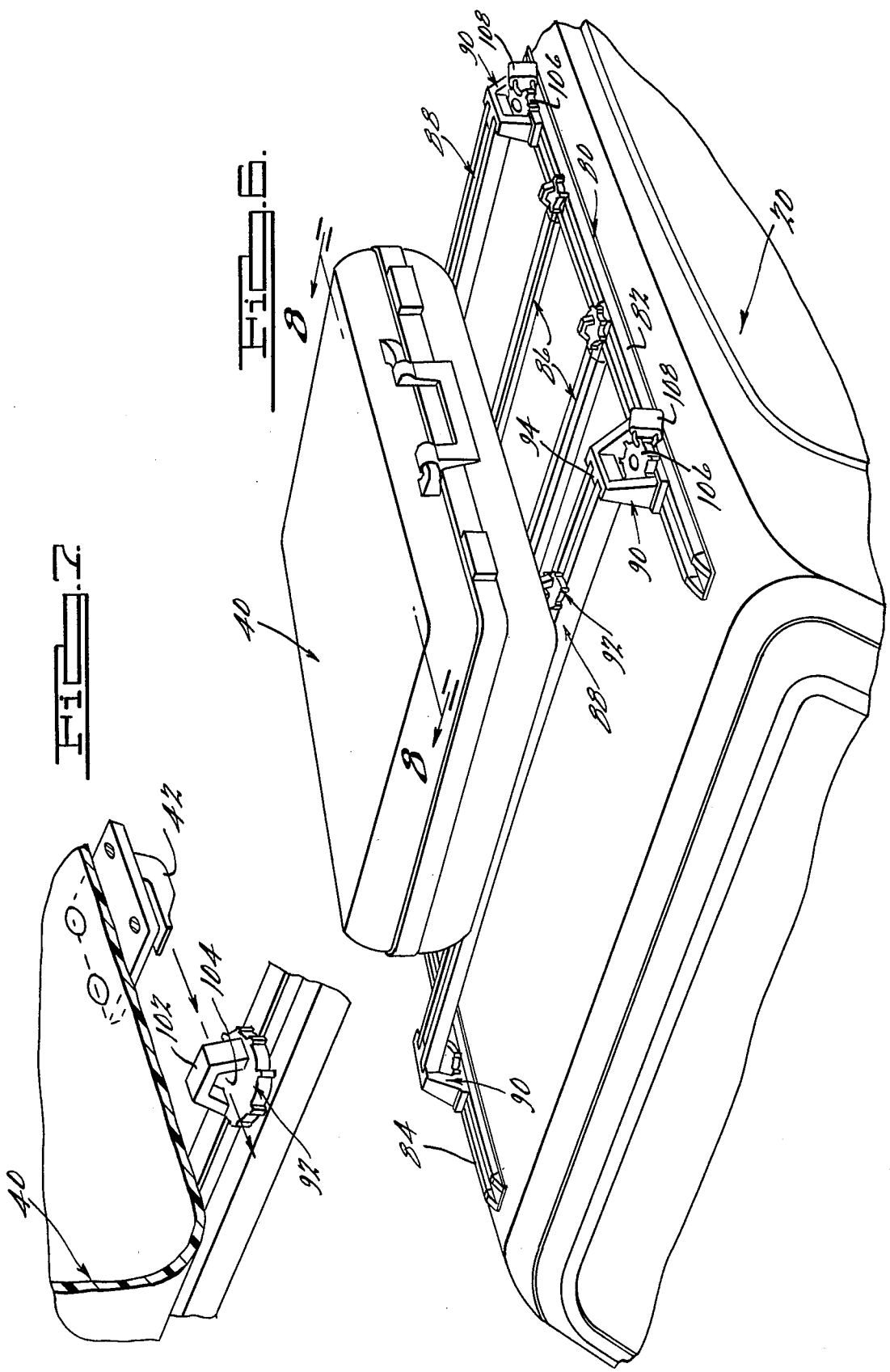

COMBINATION OF LUGGAGE CARRIER AND PERSONAL LUGGAGE

BACKGROUND OF THE INVENTION

Automobiles, and particularly passenger cars, are undergoing drastic design changes primarily because of demands that the cars be smaller. This has diminished, or perhaps even removed entirely, available space for the storage of articles such as personal luggage, suitcases, and the like, necessary for travel. There is no longer space interior of the car, either in the passenger compartments or under the rear deck, for this purpose.

It has, of course, been known to provide luggage racks of one kind or another on the exterior surfaces of cars which would serve as supports for luggage and in the use of which luggage could be lashed down by ropes, belts and the like.

Known luggage racks of the basic type that are presently available are such as those disclosed in the following prior patents:

| Inventor | U.S. Pat. No. | Date Granted |
|---|---|---|
| J. A. Bott | 4,099,658 | July 11, 1978 |
| J. A. Bott | 3,253,755 | May 31, 1966 |
| J. A. Bott | 3,330,454 | July 11, 1967 |
| J. A. Bott | 4,015,760 | April 5, 1977 |
| J. A. Bott | 4,055,284 | October 25, 1977 | and the following pending applications of J. A. Bott:

| Our Case No. | Serial No. | Filing Date |
|---|---|---|
| 52 | 759,495 | January 14, 1977 |
| 76 | 952,393 | October 18, 1978 |
| 81 | 9,608 | February 5, 1979 |

SUMMARY OF THE INVENTION

Both the luggage being carried and the permanent luggage carrier on the automobile have each been specially constructed and combined so that luggage in the form of personal suitcases, for example, may be readily and dependably disposed on and removably secured on the carrier. Since the luggage is on the exterior of the vehicle it is subjected to severe wind forces and the cooperating attachments are such that the luggage is secured against these forces. The elements of the carrier are adjustable so that suitcases, for example, of different sizes may be reliably accommodated.

The construction and combination is also such that the luggage may be quickly and easily released from attachment to the carrier and carried away for normal use.

The design and construction are such that conventional luggage such as the well known airplane luggage formed of fiber glass or other material, need only have relatively simple securing elements applied to one of the outer surfaces of the luggage, leaving the normal personal use of the luggage undisturbed.

More specifically, strong hook-like elements are secured to the undersurface of the suitcase adjacent the one edge which are adapted to hook into tiedown elements mounted on the carrier slats.

An interlock between the case and the carrier is provided adjacent the opposite, underedge of the suitcase illustrated as being in the form of a hasp like interlock. One part is secured to the underside of the suitcase and interlocks with a cooperating part which is adjustably mounted on the track of one of the slats. These parts may be held together by a cooperating hairpin spring pin and further secured by a padlock received in aligned holes in clasp parts.

BRIEF DESCRIPTION OF THE DRAWINGS

FIG. 1 is a perspective view of one arrangement of the combination of the luggage carrier and the personal luggage pieces embodying the invention and showing the carrier mounted on the rear deck cover of an automobile partially shown.

FIG. 2 is an enlarged, fragmentary perspective view of a portion of the carrier tracks and a portion of the luggage, separated from each other and illustrating the manner of interlocking one edge of the luggage to the carrier.

FIG. 6 is a view similar to FIG. 1 of a modified form of the present invention and showing the carrier mounted on the roof of the vehicle.

FIG. 7 is a view similar to FIG. 2 and illustrating the interlocking arrangement of the modified embodiment of FIG. 6.

DESCRIPTION OF PREFERRED EMBODIMENTS

Figure 8:
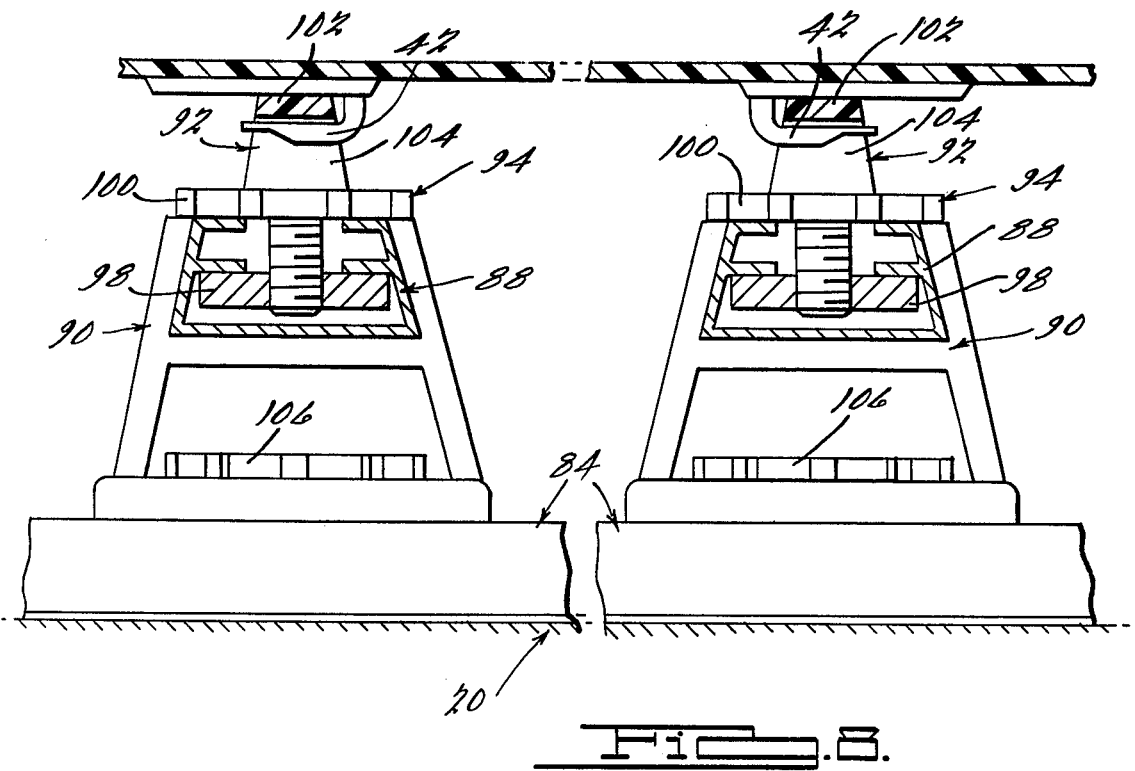
FIG. 8 is an enlarged, broken view taken substantially along the line 8—8 of FIG. 6.

One embodiment of the invention is shown in FIGS. 1 through 5 of the drawings and a second embodiment as shown in FIGS. 6 through 8.

Referring to FIGS. 1 through 8, the first embodiment is illustrated. Generally, the luggage carrier is similar to that disclosed in Bott U.S. Pat. No. 4,099,658 above referred to.

In FIG. 1 the rear portion of a vehicle 20 is partially illustrated having a rear deck or trunk lid 22. Transversely spaced, identical and parallel slats 24 are permanently attached to the outside, substantially horizontal surface of the trunk lid 22 and extend longitudinally of the vehicle as exemplified in the illustration. Elastomeric mounting pads 26 are interposed between the slats 24 and the surface of the trunk lid 22. The slats 24 are secured to the trunk-like by sheet metal screws, as in the Bott patent aforesaid.

A raised cross bar 32 is mounted on the trunk lid 22 adjacent the rear ends of the outer slats 24 through end stanchions 34, which in turn are mounted on and secured to the rear deck surface 22.

Figure 4:
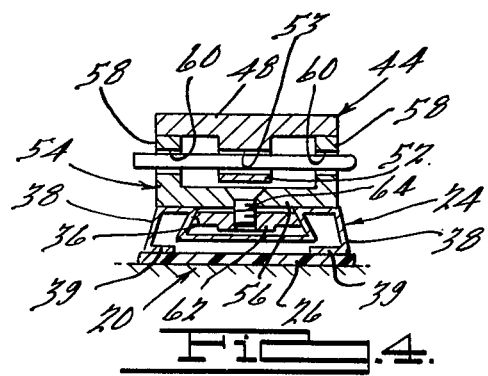
FIG. 4 is a cross sectional view taken along the line 4—4 of FIG. 3 but with the parts together in locked position.

Each slat 24 is formed of a sheet metal stamping of a material such as stainless steel. The slat is formed, in cross section, to provide an upwardly opening trackway or dovetail shaped channel 36 with tapered outer sides 38 terminating in inwardly directed flanges 39 which form the bottoms of the slats and rest on the pads 26 (FIGS. 2 and 4).

The luggage carriers in the form of conventional suitcases 40 are removably secured to the slats 24 of the luggage carrier. The suitcases are preferably of the type made of a strong plastic material such as fiber glass and constructed so that they are substantially weather proof. The system and construction of the invention is, of course, adapted for use with other cases and even small trunks.

The suitcases 40 have spaced attaching members in the form of hook-like members 42 secured to the under surfaces thereof in spaced relation to each other adjacent one edge. Each member 42 includes a bottom plate which is rivited to the suitcases with the open hook facing toward the adjacent edge.

A hasp-like lock 44 is secured to the opposite edge of the suitcase and provides an interlock between that side of the suitcase and the luggage carrier. The lock 44 includes a bar having an inner portion 46 riveted to the under side of the case 40 with a projection 48 at one edge. The projection 48 has an opening 50 adjacent the end and an intregal depending member 52 on the underside. The depending member 52 has a transverse opening 53 therethrough.

The cooperating part of the lock 44 is indicated at 54 and is mounted on the under slat 24 for adjustment along the trackway 36. Part 54 is generally U-shaped having a bottom 56 and upstanding sides 58 with transverse alligned openings 60 therethrough.

The part 54 is mounted for adjustment along the trackway in order to accommodate suitcases of different sizes or widths. For this purpose a nut 62 having tapered side walls to conform to the tapered walls 36 of the trackway is connected to the bottom 56 by a screw 64. By loosening and tightening the screws 64, the lock part 54 may be adjustably positioned along the trackway 36 to accommodate cases of different sizes. In the tightened position the tapered sides of the nut are dovetailed against the tapered sides of the trackway.

Tiedowns 66 are disposed in the trackways at opposite ends under the member 42 and may be suitably fixed to the trackways or adjustably fixed thereon by structure like that described above for the nut 62. Each tiedown has an opening 68 therethrough opening in a direction longitudinally of the trackway so that it receives the hook 42 to secure that edge of the case against movement, except lowering movement of the case therearound.

Figure 3:
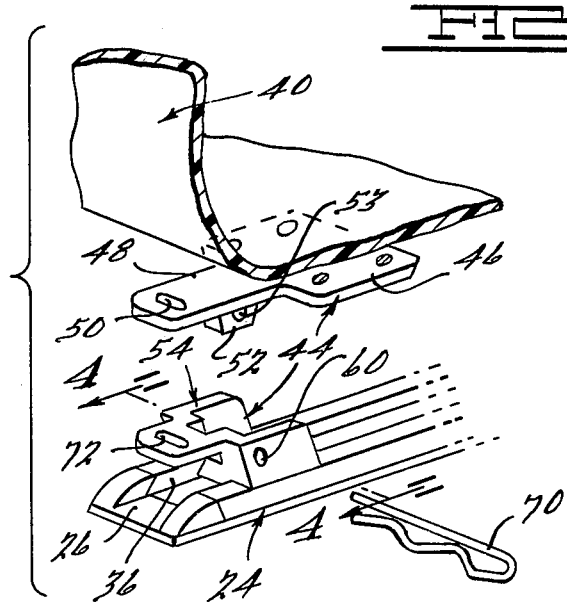
FIG. 3 is an enlarged, fragmentary perspective view of a portion of the carrier tracks (at the opposite end to that of FIG. 2) and a portion of the luggage, separated from each other and illustrating the manner of interlocking the opposite edge of the luggage to the carrier.
Figure 5:
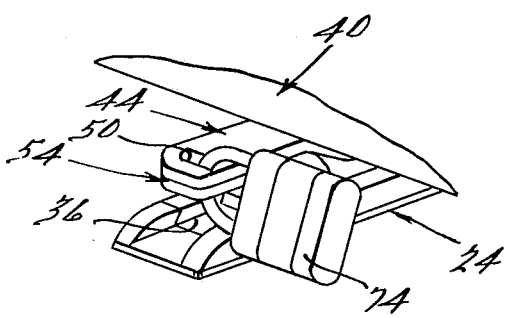
FIG. 5 is a partial, perspective view of parts in FIG. 3, but with parts together and locked with a conventional lock.

With that edge of the case secured, the case is lowered so that the cooperating parts of the lock 44 are positioned together as shown in FIGS. 3, 4 and 5. The depending member 52 is positioned within the upward opening of part 54 with the underside of projections 53 and 60 alligned. A hairpin spring pin 70 is receivably within the alligned openings 53 and 60 to secure the lock parts 48 and 54 together with the cooperation of the hooks 42 and the tiedowns.

At the same position the opening 50 is alligned with an opening 72 of part 54 and a padlock 74 may be applied to the openings 50 and 72 for security purposes.

Referring to FIGS. 6, 7 and 8, another embodiment of the present invention is illustrated which includes the broad aspect of the invention as also illustrated in FIGS. 1 to 5.

In this embodiment the carrier 80 is mounted on the roof of the vehicle and is substantially the same as that disclosed and claims in Bott co-pending application Ser. No. 9,608, filed Feb. 5, 1979.

In general, the luggage carrier 80 comprises a pair of laterally spaced, longitudinally extending slats 82 and 84 which are secured upon the roof portion of vehicle 20 at positions adjacent the lateral sides or edges thereof. Cross slats, generally designated by the numeral 86 may be provided, if desired, and be constructed and mounted as in the co-pending application Ser. No. 9,608, referred to.

The luggage carrier 80 also includes a pair of cross rails, generally designated by the numeral 88, which extend laterally or transversely of and between the slats 82 and 84, and are spaced upwardly from the plane of the roof and operatively supported upon the slats 82 and 84 by means of four stanchions assemblies, generally designated by the numeral 90 which are located one at each end of the cross rails 80. The cross rails 88 are preferably of a cross section shown in FIG. 8, in which a trackway is defined within each cross rail 88 providing a channel adapted to receive one or more clamping or tiedown units indicated at 92.

Each of the stancion assemblies 90 includes an inwardly projecting mounting portion 94 which is adapted to be telescopically received within adjacent of an associated cross rail 88 and be secured therewith as in the co-pending application Ser. No. 9,608.

The slidable tiedown assembly 92, includes a rotatable member 94, a threaded stud 96, and a clamping plate 98. The tiedown member 92 comprises an annular manually rotatable portion 100 with an integral upwardly projecting loop portion 102 extending generally perpendicularly to the plane of the annular portion 100 and providing an opening 104.

The stanchions 90 are mounted for adjustment along the trackways 82 and 84 as in co-pending application Ser. No. 9,608. If desired, one of the trackways may be fixed and only one adjusted, or both, as may be desired. As shown both are adjustable with respect to each other, by way of illustration. Each stanchion 90 is slidably mounted on its respective trackway 82 or 84 by means of a study having an enlarged gripping head 106. The study extends through an opening in the bottom of the stanchion and threads into a clamping plate in the trackway 82 or 84. Such trackways and the cooperating clamping plate are similar in construction to that shown for the adjustable lock part 54 shown in FIG. 4.

In the use and application of the luggage cases in this embodiment, four hook clamps 42 are secured to the under surface of the case adjacent each corner with the hook openings facing outwardly (FIGS. 7 and 8). The hooks 42 adjacent one edge are then disposed within openings 104 of adjacent cross bar 88. If not already fixed in position on the trackways 82 and 84, that cross bar should be fixed by stud 106 in its adjusted position. The other cross bar 88 remains free to be adjusted along the trackways toward or away from the first cross bar to accommodate the size of the particular case being mounted. With the case dropped to position on the carrier, the second cross bar 88 is moved toward the first to inter-engage the hooks 42 at that edge of the luggage case with cooperating openings 104 in tiedowns 92, to secure that edge of the case to the carrier. The luggage is thus secured to the carrier until released by the operator in moving one of the cross bars away from the other. The luggage case can then be lifted off the carrier.

In order to secure the cross bars against accidental loosening or theft, an opening may be provided in the head of each stud 106 for the reception of a padlock 108 which is large enough to prevent the gripping head of the stud 106 from being turned within the stanchion.

Formal changes may be made in the embodiments specifically illustrated without departing from the spirit of the invention, the scope of which is set forth in the appended claims.

I claim:

1. The combination of a luggage carrier permanently mounted on a generally longitudinally extending exterior automobile body surface and a personal luggage case removably attached to said carrier, said carrier including elongated slats mounted on said body surface, said slats forming trackways with upwardly opening channels, tiedown elements adjustably disposed in said channels, attachment openings in the tiedown elements in alignment with said channels, interlocking projections fixed to the underside of said luggage case, disposed adjacent one edge thereof, and receivable in said openings upon relative movement between said slats and said luggage case to provide an interlock therebetween.

2. The combination according to claim 1 in which second locking means is provided adjacent the opposite edge of the luggage case from said interlocking projections and additional locking means in the trackway cooperable with said second locking means to provide an interlock therebetween and effect an interlock between the luggage case and the slats along opposite edges of the luggage case.

3. The combination according to claim 2 in which all of the interlocking means are releasable.

4. The combination according to claim 1 in which the trackways are adjustable toward and away from each other to accommodate luggage cases of different sizes.

5. The combination according to claim 1 in which the interlocking projections are in the form of hooks.

6. The combination according to claim 2 in which the second locking means is in the form of a clasp.

7. Combination of a luggage carrier permanently mounted on a general longitudinally extending exterior automobile body surface and a personal luggage case removably attached to said carrier, said carrier including elongated slats mounted on said body surface, said slats forming trackways with upwardly opening channels, spaced cross rails mounted on said slat trackways extending transversely and adjustable relative to each other, said cross rails having upwardly opening channels, tiedown elements adjustably disposed in said cross rail channels, an attachment opening in the tiedown elements facing transversely of said cross rail channels, interlocking projections in the form of hooks fixed to the underside of said luggage case adjacent the channels thereof, the openings of said hook projections facing outwardly of the adjacent edges of the case, said hooks being receivable in said tiedown openings upon relative movement between said cross rails toward each other to provide an interlock therebetween.

8. The combination of a luggage carrier mounted on a generally longitudinally extending exterior automobile body surface and a luggage case removably attached to said carrier, said carrier including elongated trackway members having upwardly opening channels and tiedown elements adjustably disposed in said channels having openings disposed above said channels, said luggage case including projections fixedly secured to one side of said case having means for interlocking said projections to said tiedown elements through said attachment openings and slidably attaching said case to said tiedown elements.

9. The combination of claim 8 wherein means for interlocking and slidably attaching further comprises means for pivotably attaching said luggage case to said tiedown elements.

10. The combination of claim 8 wherein said trackway members comprise elongated slats.

* * * * *